W. S. HARLEY.
MOTOR CYCLE STAND.
APPLICATION FILED JUNE 2, 1909.
946,037.
Patented Jan. 11, 1910.
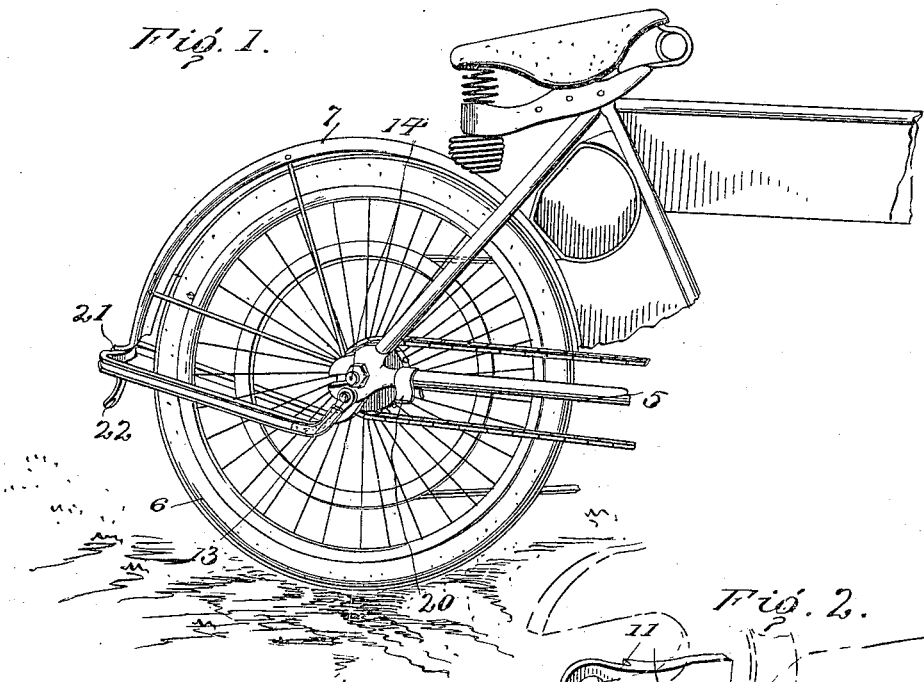
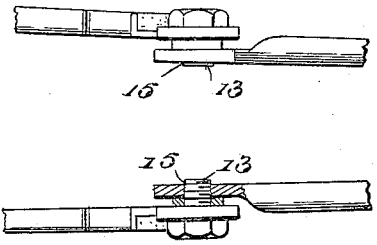
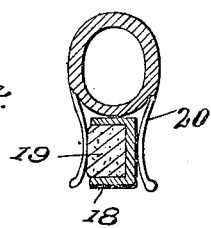
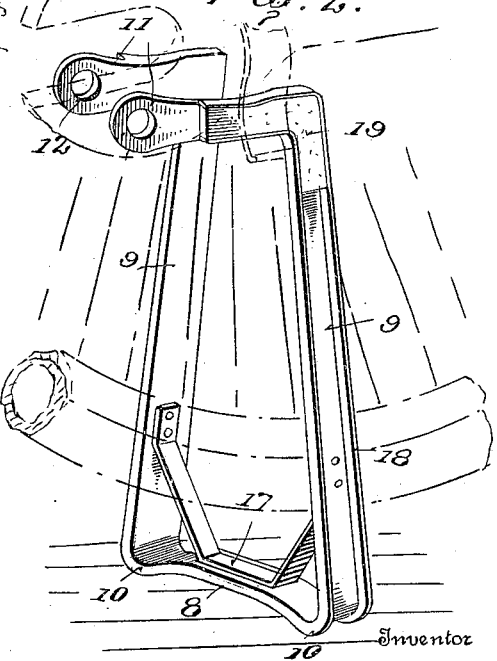
Witnesses
Inventor
William S. Harley
By [signature], Attorneys

UNITED STATES PATENT OFFICE.

WILLIAM S. HARLEY, OF MILWAUKEE, WISCONSIN, ASSIGNOR TO HARLEY-DAVIDSON COMPANY, OF MILWAUKEE, WISCONSIN.

MOTOR-CYCLE STAND.

946,037.　　　　　Specification of Letters Patent.　　Patented Jan. 11, 1910.

Application filed June 2, 1909.　Serial No. 499,769.

*To all whom it may concern:*

Be it known that I, WILLIAM S. HARLEY, citizen of the United States, residing at Milwaukee, in the county of Milwaukee and State of Wisconsin, have invented certain new and useful Improvements in Motor-Cycle Stands, of which the following is a specification.

This invention relates to stands or supports for motor cycles and more particularly to a stand of this character especially designed to support a motor cycle in an upright position when not in use, and for holding the latter steady when effecting any necessary repairs or adjustments thereto while the cycle is in use.

The object of the invention is to provide a stand or support capable of being readily attached to or detached from the frame of a motor cycle and which will permit the removal of the rear wheel of the cycle without the necessity of first removing said stand.

A further object is to provide a stand or support including a frame or yoke having angularly disposed arms for pivotal connection with the cycle frame beneath the rear axle thereof, so that said frame or yoke may be swung downwardly in contact with the ground with the angular arms of the frame or yoke bearing against the cycle frame in advance of the pivotal axis thereof, thus to support the weight of the motor cycle from said frame.

A further object is to provide improved means for locking the frame in elevated or inoperative position and means for preventing the frame or yoke from scratching or otherwise mutilating the cycle frame when said pivoted frame or yoke is swung downwardly to operative position.

For a full understanding of the invention and the merits thereof, and also to acquire a knowledge of the details of construction and the means for effecting the result, reference is to be had to the following description and accompanying drawings, in which;

Figure 1 is a perspective view of a portion of a motor cycle provided with a rest or stand constructed in accordance with my invention, the pivoted frame or yoke being shown in inoperative position; Fig. 2 is a perspective view of the pivoted frame or yoke showing the same swung downwardly to operative position; Fig. 3 is a detailed top plan view showing the manner of connecting the pivoted yoke or frame with a motor cycle; and Fig. 4 is a transverse sectional view.

Corresponding and like parts are referred to in the following description and indicated in all the views of the accompanying drawings by the same reference characters.

The improved stand or rest forming the subject matter of the present invention is especially designed for attachment to motor cycles, bicycles or similar vehicles and by way of illustration is shown in connection with a motor cycle of the ordinary construction in which 5 designates the supporting frame, 6 the rear wheel and 7 the mud guard secured in the usual manner above the frame of the rear wheel as shown.

The device comprises a substantially U-shaped frame or yoke, preferably formed of a flat strip of metal having its intermediate portion bent to produce a transverse shoe or base 8, terminating in upwardly extending converging legs 9, the intermediate portion of the base 8 being bent upwardly to produce depending feet 10 adapted to bear against the ground when the yoke or stand is swung downwardly to operative position as best shown in Fig. 2 of the drawings.

The upper ends of the legs 9 are bent laterally to form transversely disposed arms 11 having terminal openings 12 formed therein and constituting bearings for the reception of a suitable pivot pin or bolt 13.

The frame or yoke is pivotally mounted for swinging movement on the frame 5 of the motor cycle beneath the axle 14 of the rear wheel 6, there being suitable openings 15 formed in the frame 5 for the reception of the pivot pin or bolt 13.

The frame 5 around the openings 15 is formed with an enlargement or boss having an opening formed therein registering with the opening 15 and provided with interior threads for engagement with the corresponding threads of the pivot pin or bolt 13, said pin or bolt being provided with enlarged heads adapted to engage the perforated extremities of the arms 11 for retaining the frame or yoke in position on the motor cycle.

The frame or yoke is reinforced and strengthened by the provision of a brace 17 having its intermediate portion riveted or otherwise rigidly secured to the central portion of the base 8 and its opposite ends deflected laterally and secured in any suitable manner to the interior walls of the legs 9.

The metal forming the pivoted frame or yoke is preferably bent or stamped to produce oppositely disposed reinforcing ribs 18, said ribs preferably terminating short of the perforated ends of the arms 11 to form sockets for the reception of a strip of felt, rubber or other yieldable material constituting a pad 19 for the purpose of preventing scratching or mutilation of the frame of the motor cycle when the pivoted frame or yoke is swung laterally to either operative or inoperative position.

Depending from the frame 5 of the motor cycle and permanently secured thereto are spaced clips 20 adapted to embrace the arms 11 for the purpose of preventing lateral movement of the yoke or frame when in operative position.

Attention is here called to the fact that when the pivoted frame or yoke is swung downwardly in engagement with the ground the arms 11 will bear against the frame 5 in advance of the rear axle 14 so that the yoke will support the weight of the cycle from the frame of the latter while at the same time the weight of said machine will tend to prevent the frame or yoke from swinging rearwardly.

As a means for supporting the pivoted frame or yoke in elevated or inoperative position the lower end of the mud guard 7 is provided with a metallic strip, an intermediate portion of which is bent laterally to produce a loop 21 adapted to receive and embrace the base 8 of the yoke when the latter is swung rearwardly and upwardly, the free end of the metal strip at said loop being deflected rearwardly to produce a curved face 22 against which the base 8 of the pivoted frame or yoke bears in its upward passage, thereby to press the strip laterally and to permit the base 8 to enter the loop 21 in the manner described.

When it is desired to use the stand or support for retaining the motor cycle in upright position, either when the latter is in use or at rest in a garage or other repository, the spring clip is released by exerting a rearward pressure on the curved face 22, thus permitting the frame or yoke to drop by gravity to lowered position, the rear wheel of the motor cycle being elevated and the base end of the yoke passed beneath the same until the upper portion of the arms 11 enter the clips 20 and bear against the frame of said motor cycle. When the stand or support is not in use the latter is swung upwardly and rearwardly until the base 8 of the wheel engages the loop 21 in the manner before described and in which position the yoke will be supported against accidental displacement during the operation of the machine.

Having thus described the invention, what is claimed as new is;

1. The combination with a motor cycle including a frame, having depending clips secured thereto of a yoke having angularly disposed arms for pivotal connection with the frame, pads carried by said angular arms for engagement with the clips when the yoke is swung downwardly to operative position, and means for supporting the yoke in inoperative position.

2. The combination with a motor cycle including a frame, having clips depending therefrom and provided with a mud guard, of a yoke having angularly disposed arms for pivotal connection with the frame and adapted to be swung downwardly to operative position with the arms engaging the clips, and a resilient strip secured to the mud guard and having its free end curved laterally and its intermediate portion provided with a socket adapted to receive the base of the yoke when the latter is swung upwardly to inoperative position.

3. The combination with a motor-cycle of a yoke pivotally mounted on the frame of the motor-cycle beneath the rear axle thereof and free to swing independently of said axle, horizontal arms extending laterally from the upper portion of the yoke and adapted to bear against and support the frame when the yoke is swung downwardly to operative position beneath said frame and means for supporting the yoke in inoperative position.

4. The combination with a motor-cycle, of a yoke detachably mounted for pivotal movement of the frame of the motor-cycle beneath the rear axle thereof and provided with substantially horizontally disposed arms adapted to bear against the frame in advance of the rear axle when the yoke is swung downwardly to operative position beneath the rear wheel of said motor-cycle, and means for supporting the yoke in inoperative position.

5. The combination with a motor-cycle having transversely disposed openings formed in the frame thereof beneath the rear axle and provided with depending clips, of a yoke mounted for swinging movement in the motor-cycle frame and provided with horizontally disposed arms having openings formed therein for registration with the openings in the motor-cycle frame, fastening devices extending through the openings in the arms and frame and forming the pivotal axis of the yoke, pads secured to the horizontal arms and adapted to engage the depending clips when the yoke is swung downwardly to operative position, and means for supporting the yoke in inoperative position.

6. A stand for motor-cycles formed with a single strip of metal having its intermediate portion bowed upwardly to produce depending feet and thence extended on converging lines to produce longitudinally disposed legs, the upper ends of which are bent laterally to form angularly disposed perforated arms, the inner faces of which are smooth and unobstructed, the opposite edges of the metal being bent to form reinforcing ribs terminating short of the perforated ends of the arms to produce sockets, pads seated in said sockets and partially covering the angular arms, and a continuous brace having its intermediate portion secured to the bowed portion of the yoke and its opposite ends terminating at and secured to the intermediate portions of said legs.

In testimony whereof I affix my signature in presence of two witnesses.

WILLIAM S. HARLEY. [L. S.]

Witnesses:
D. E. JOHNSON,
BESSIE A. LOYDA.